(12) United States Patent
Burgers et al.

(10) Patent No.: US 8,689,547 B2
(45) Date of Patent: Apr. 8, 2014

(54) ANNULAR HEAT EXCHANGER

(71) Applicant: Dana Canada Corporation, Oakville (CA)

(72) Inventors: John G. Burgers, Oakville (CA); Michael A. Martin, Hamilton (CA); Ihab Edward Gerges, Oakville (CA); Herve Palanchon, Leverkusen (DE)

(73) Assignee: Dana Canada Corporation, Oakville, Ontario (CA)

( * ) Notice: Subject to any disclaimer, the term of this patent is extended or adjusted under 35 U.S.C. 154(b) by 0 days.

(21) Appl. No.: 13/845,215

(22) Filed: Mar. 18, 2013

(65) Prior Publication Data

US 2013/0213017 A1    Aug. 22, 2013

Related U.S. Application Data

(63) Continuation of application No. 12/813,830, filed on Jun. 11, 2010, now Pat. No. 8,424,296.

(51) Int. Cl.
*F01N 3/02* (2006.01)

(52) U.S. Cl.
USPC .................. 60/298; 60/292; 60/296; 60/299; 60/320; 60/324; 165/103; 165/154; 165/155

(58) Field of Classification Search
USPC .................. 60/292, 296, 298, 299, 320, 324; 165/103, 154, 155
See application file for complete search history.

(56) References Cited

U.S. PATENT DOCUMENTS

| | | | |
|---|---|---|---|
| 2,662,749 A | 12/1953 | Buschow | |
| 3,015,475 A | 1/1962 | Meijer et al. | |
| 3,429,656 A | 2/1969 | Taylor et al. | |
| 3,700,029 A | 10/1972 | Thrun | |
| 3,733,181 A | 5/1973 | Tourtellotte et al. | |
| 3,736,105 A | 5/1973 | Tourtellotte et al. | |
| 4,204,573 A | 5/1980 | Clark | |
| 4,257,480 A | 3/1981 | Winkleblack | |
| 4,485,622 A | 12/1984 | Takagi et al. | |
| 4,995,454 A | 2/1991 | Thompson | |
| 5,376,341 A | 12/1994 | Gulati | |
| 5,484,575 A | 1/1996 | Steenackers | |
| RE35,890 E | 9/1998 | So | |
| 6,116,022 A | 9/2000 | Woodward | |

(Continued)

FOREIGN PATENT DOCUMENTS

| | | |
|---|---|---|
| FR | 2859239 A1 | 12/2003 |
| FR | 2859238 A1 | 3/2005 |
| JP | 2001164932 A | 6/2001 |

*Primary Examiner* — Thomas Denion
*Assistant Examiner* — Jorge Leon, Jr.
(74) *Attorney, Agent, or Firm* — Marshall & Melhorn, LLC (57) ABSTRACT

An annular heat exchanger for cooling hot gases comprises an inner shell, an intermediate shell and an outer shell. Where the heat exchanger is integrated with a catalytic converter for treatment of hot exhaust gases in a motor vehicle, the inner shell contains a catalyst for treatment of the exhaust gases. Inner and outer gas flow passages are provided between the shells, and a coolant flow passage is provided, either on the outer surface of the outer shell, or between the intermediate and outer shells. The exhaust gases change direction twice as they pass through the heat exchanger, and the annular structure of the heat exchanger provides a large surface area, and a large flow section, relative to volume, and thereby provides effective heat exchange without significantly increasing space requirements.

15 Claims, 10 Drawing Sheets

(56) References Cited

U.S. PATENT DOCUMENTS

| | | |
|---|---|---|
| 6,151,891 A | 11/2000 | Bennett |
| 6,273,183 B1 | 8/2001 | So et al. |
| 6,748,736 B1 | 6/2004 | Claverie et al. |
| 7,104,358 B2 | 9/2006 | Frederiksen |
| 7,172,737 B2 | 2/2007 | Rong et al. |
| 7,182,125 B2 | 2/2007 | Martin et al. |
| 7,191,824 B2 | 3/2007 | Wu et al. |
| 7,213,639 B2 | 5/2007 | Danielsson et al. |
| 7,614,389 B2 | 11/2009 | Ruckwied |
| 2003/0005686 A1 | 1/2003 | Hartick |
| 2003/0033801 A1 | 2/2003 | Hinder et al. |
| 2006/0054381 A1 | 3/2006 | Takemoto et al. |
| 2006/0174611 A1 | 8/2006 | Dilley et al. |
| 2009/0038302 A1 | 2/2009 | Yamada et al. |
| 2009/0044525 A1 | 2/2009 | Husges et al. |
| 2009/0049832 A1 | 2/2009 | Hase |
| 2009/0050302 A1 | 2/2009 | Husges et al. |
| 2009/0235654 A1 | 9/2009 | Kobayashi et al. |
| 2009/0277165 A1 | 11/2009 | Geskes et al. |
| 2010/0043413 A1 | 2/2010 | Orihashi et al. |
| 2010/0146954 A1* | 6/2010 | Sloss et al. .............. 60/320 |
| 2010/0186397 A1 | 7/2010 | Emrich et al. |
| 2011/0131961 A1 | 6/2011 | Lee et al. |

\* cited by examiner

ANNULAR HEAT EXCHANGER

CROSS-REFERENCE TO RELATED APPLICATION

This application is a continuation of U.S. patent application Ser. No. 12/813,830 filed Jun. 11, 2010, the contents of which are incorporated herein by reference.

FIELD OF THE INVENTION

The invention relates to annular heat exchangers for use in removing heat from a gas stream, particularly for use in cooling hot exhaust gas or charge air in a motor vehicle.

BACKGROUND OF THE INVENTION

The need to remove heat from gas streams arises in numerous applications. In motor vehicles, for instance, it may be necessary to remove heat from the intake and/or exhaust gas streams. For example, intake air (or "charge air") requires cooling in some applications, for example in turbocharged or supercharged engines. In vehicles incorporating exhaust gas recirculation (EGR) or exhaust gas heat recovery (EGHR) systems, heat is removed from the exhaust gas stream. The heat removed from the intake or exhaust gas stream is typically transferred to a liquid coolant in a heat exchanger.

In motor vehicle exhaust applications, heat recovery devices are usually located in series with other under-vehicle exhaust components such as catalytic converters. Series arrangement of individual exhaust components is wasteful of space, may increase the cost and weight of the vehicle, and limits the ability to control the temperature of exhaust components upstream of the heat recovery device. The incorporation of a bypass flow path into the heat recovery device usually involves the addition of an external pipe to the exhaust system, and is yet another component which must be accommodated under the vehicle.

An example of an annular heat recovery device for use in an exhaust system of a motor vehicle is disclosed in US 2009/0038302 A1 (Yamada et al.), published on Feb. 12, 2009. While the Yamada et al. device provides a central bypass flow path and thereby eliminates the need for an external bypass, its installation downstream of the catalytic converter (FIG. 6 of Yamada et al.) fails to address the other issues noted above.

There remains a need for simple and effective heat recovery devices for motor vehicle intake and exhaust gas systems which minimize usage of space, weight, and number of components, and which provide enhanced opportunities for temperature control of other system components.

SUMMARY OF THE INVENTION

The invention provides a heat exchanger having a first end with a first gas flow opening and a second end with a second gas flow opening, wherein the first and second ends of the heat exchanger are spaced apart along a gas flow axis. The heat exchanger comprises an inner shell, an intermediate shell and an outer shell. The inner shell defines an inner gas flow passage extending along the gas flow axis. The inner gas flow passage has a first open end and a second open end, wherein the first open end of the inner gas flow passage is in flow communication with the first gas flow opening of the heat exchanger. The intermediate shell surrounds the inner shell, wherein a space between the inner shell and the intermediate shell defines an intermediate gas flow passage extending along the gas flow axis. The intermediate gas flow passage has a first open end and a second open end, and wherein the second open end of the intermediate gas flow passage is in flow communication with the second open end of the inner gas flow passage. The outer shell surrounds the intermediate shell, wherein a space between the intermediate shell and the outer shell defines an outer gas flow passage extending along the gas flow axis. The outer gas flow passage has a first open end and a second open end, wherein the first open end of the outer gas flow passage is in flow communication with the first open end of the intermediate gas flow passage and the second open end of the outer gas flow passage is in flow communication with the second gas flow opening of the heat exchanger. The heat exchanger further comprises a coolant flow passage having an inlet and an outlet and extending along the gas flow axis, wherein the coolant flow passage is in heat exchange communication with one or both of the intermediate gas flow passage and the outer gas flow passage.

Where the first end of the heat exchanger is upstream of the second end of the heat exchanger, the first gas flow opening defines a gas inlet opening and the second gas flow opening defines a gas outlet opening. In this case, the first open end of each of the inner, intermediate and outer gas flow passage is upstream of the respective second end of each gas flow passage.

Where the first end of the heat exchanger is downstream of the second end of the heat exchanger, the first gas flow opening defines a gas outlet opening and the second gas flow opening defines a gas inlet opening. In this case, the first open end of each of the inner, intermediate and outer gas flow passage is downstream of the respective second end of each gas flow passage.

In one aspect, the outer shell has a radially inwardly extending wall portion which is sealingly connected to the inner shell at a location between the first end of the heat exchanger and the first open ends of the intermediate and outer gas flow passages, wherein the radially inwardly extending wall portion of the outer shell defines a turnaround plenum in which the gas flow changes direction between the intermediate and outer gas flow passages.

In another aspect, the intermediate shell includes a radially inwardly extending wall portion which is located between the second end of the heat exchanger and the second open ends of the inner and intermediate gas flow passages, wherein the radially inwardly extending wall portion of the intermediate shell defines a turnaround plenum in which the gas flow changes direction between the inner and intermediate gas flow passages.

In yet another aspect, the radially inwardly extending wall portion of the intermediate shell has an opening which is selectively opened and closed by a valve, wherein opening of the valve permits direct flow communication between the first and second gas flow openings through the inner gas flow passage, thereby providing a bypass flow passage for the gas. The complete closing of the valve substantially prevents direct flow communication between the first and second gas flow openings through the inner gas flow passage.

In yet another aspect, the gas is a motor vehicle exhaust gas, and the inner gas flow passage contains a catalyst for treating the motor vehicle exhaust gas.

In yet another aspect, the coolant flow passage comprises a coolant jacket attached to an outer surface of the outer shell, such that the coolant circulating through the jacket is in heat exchange communication with the outer gas flow passage.

In yet another aspect, the intermediate shell comprises an inner jacket wall and an outer jacket wall between which the coolant flow passage is defined, wherein the coolant circulating through the coolant flow passage is in heat exchange communication with both the intermediate gas flow passage and the outer gas flow passage.

In yet another aspect, the inlet and outlet of the coolant flow passage are provided in the outer jacket wall and are axially spaced from one another, and the inlet and outlet are each provided with fittings which extend radially outwardly from the outer jacket wall, through the outer gas flow passage and through the outer shell.

In yet another aspect, at least those portions of the inner, intermediate and outer shells defining the gas flow passages are generally cylindrical about the gas flow axis, such that the inner gas flow passage is generally cylindrical and each of the intermediate and outer gas flow passages is generally annular and concentric with the inner gas flow passage.

BRIEF DESCRIPTION OF THE DRAWINGS

The invention will now be described, by way of example only, with reference to the accompanying drawings in which.

DETAILED DESCRIPTION

In the following description, several embodiments of heat exchangers according to the invention are described. The specific heat exchangers described below are adapted to remove or recover heat from the exhaust gas stream of a motor vehicle, and are integrated with the vehicle's catalytic converter. However, the invention is not restricted to exhaust gas heat exchangers for motor vehicles, but rather includes annular gas-to-liquid heat exchangers for numerous other applications, for example as intake air coolers for motor vehicles.

Figure 1:
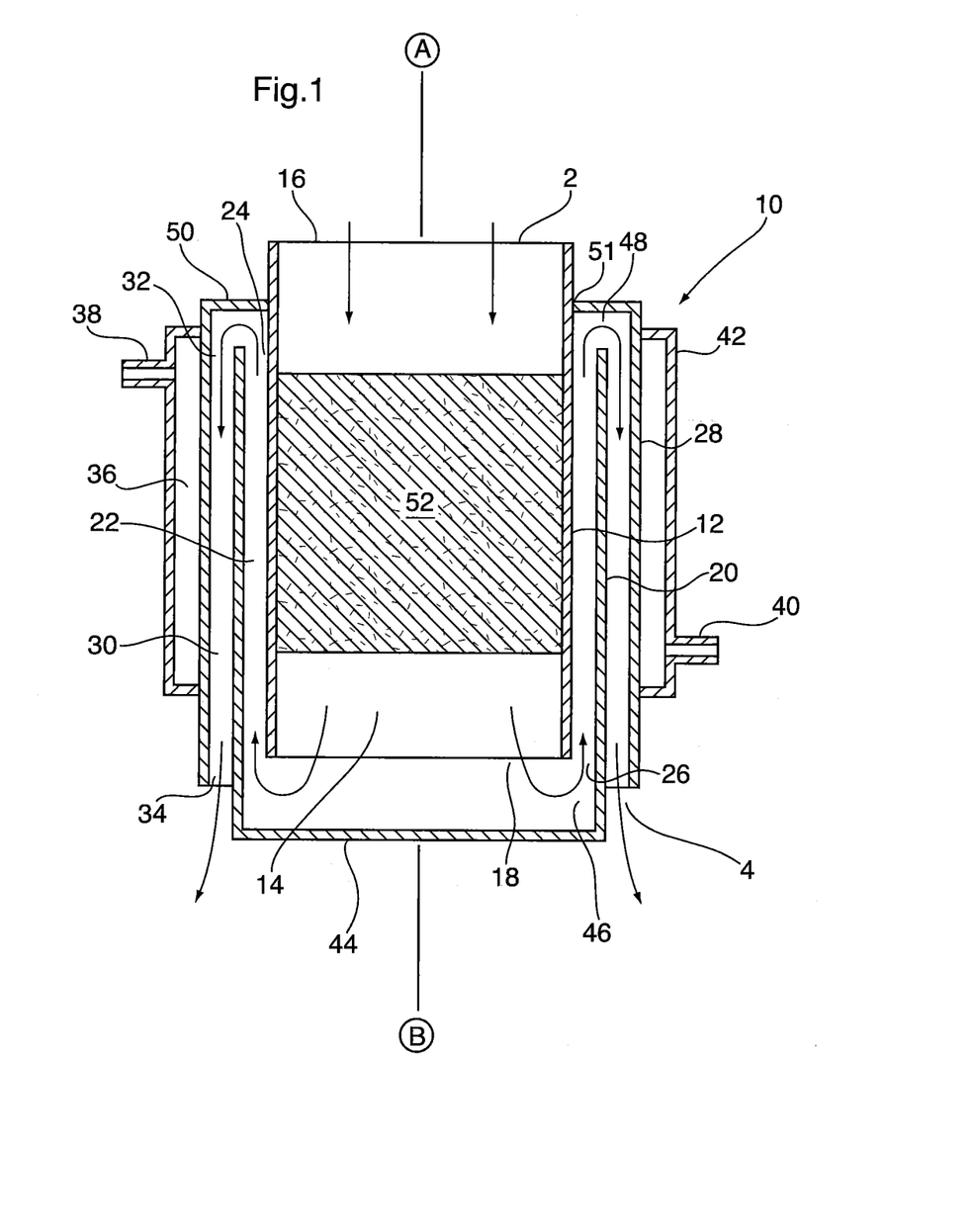
FIG. 1 is a schematic, axial cross-section through an annular heat exchanger according to a first embodiment of the invention.

Illustrated in FIG. 1 is an annular heat exchanger 10 according to a first embodiment of the invention. Heat exchanger 10 is generally in the shape of an open-ended, hollow cylinder having a side wall which is comprised of a plurality of cylindrical layers. The side wall of heat exchanger 10 extends parallel to a longitudinal axis A-B passing centrally through the hollow interior space of heat exchanger 10. The heat exchanger 10 includes a number of gas flow passages, described in detail below, and the direction of gas flow through each of the gas flow passages is shown by the arrows in FIG. 1. Although the overall direction of gas flow through heat exchanger 10 is from A to B along axis A-B, it can be seen that there are two changes in the direction of flow as the gas flows through the heat exchanger 10.

In the following description, the heat exchanger 10 and the various gas flow passages defined therein are described as having a first end and a second end. In the embodiment of FIG. 1, the first end of the heat exchanger 10 is situated closest to A and serves as the inlet opening 2, and the second end of heat exchanger 10 is situated closest to B and serves as the outlet opening 4. Similarly, the first end of each gas flow passage described below is located closer to A and the second end of each gas flow passage is located downstream from the first end, closer to B.

In the following description, terms such as "axial" and the like refer to directions which are parallel to the axis A-B, and terms such as "inner", "outer", "inward" and "outward" and the like refer to radial directions extending outwardly from or inwardly toward axis A-B, and which are transverse to axis A-B.

Heat exchanger 10 includes a cylindrical inner shell 12 which extends along axis A-B and defines an inner gas flow passage 14. The inner gas flow passage 14 extends along axis A-B and has a first open end 16 and a second open end 18. The first open end 16 of inner gas flow passage 14 defines the inlet opening 2 of heat exchanger 10, and the second open end 18 is located downstream of the inlet opening toward B. It will be appreciated that the inlet opening 2 may be provided with means, such as a flange, for connection to other exhaust system components upstream of heat exchanger 10. Such connection means are included in some of the other embodiments of the invention, described below.

Heat exchanger 10 further comprises an intermediate shell 20 which is located outwardly of, and surrounds, the inner shell 12. The annular space between the inner shell 12 and intermediate shell 20 defines an intermediate gas flow passage 22 which extends along axis A-B. The intermediate gas flow passage 22 has a first open end 24 and a second open end 26 which are spaced apart along axis A-B, with the first open end 24 being located closer to A and the second open end 26 being located upstream of the first open end 24, closer to B. As can be seen from FIG. 1, the second open end 26 of the intermediate gas flow passage 22 is in flow communication with the second open end 18 of the inner gas flow passage 14 to permit gas flow between the second open ends 18, 26 of the inner and intermediate gas flow passages 14, 22. More specifically, in the configuration shown in FIG. 1, gas exiting the inner gas flow passage 14 through its second open end 18 enters the second open end 26 of the intermediate gas flow passage 22.

Heat exchanger 10 further comprises an outer shell 28 located radially outwardly of, and surrounding, the intermediate shell 20. The annular space between the intermediate shell 20 and outer shell 28 defines an outer gas flow passage 30 extending along the axis A-B. The outer gas flow passage 30 has a first open end 32 and a second open end 34 which are spaced apart along axis A-B, with the first open end 32 being located closer to A and the second open end 34 being located downstream of the first open end 32, closer to B. As shown in FIG. 1, the first open end 32 of the outer gas flow passage 30 is in flow communication with the first open end 24 of the intermediate gas flow passage 22 to permit gas flow between the first open ends 24, 32 of the intermediate and outer gas flow passages 22, 30. More specifically, in the configuration shown in FIG. 1, gas exiting the first open end 24 of the intermediate gas flow passage 22 enters the first open end 32 of the outer gas flow passage 30. Also, the second open end 34 of the outer gas flow passage 30 defines the outlet opening 4 of the heat exchanger 10. It will be appreciated that the outlet opening 4 may be provided with means, such as a flange, for connection to other exhaust system components downstream of heat exchanger 10. Such connection means are included in some of the other embodiments of the invention, described below.

Heat exchanger 10 further comprises a coolant flow passage 36 having an inlet and an outlet provided with fittings 38, 40 which are connected to coolant conduits (not shown) of a coolant circulation system. The coolant flow passage 36 extends along the axis A-B and is in heat exchange communication with one or both of the intermediate gas flow passage 22 and the outer gas flow passage 30. In order to maximize heat transfer, the coolant flow passage 36 may extend along substantially the entire length of the outer gas flow passage 30. The length of the outer gas flow passage 30 is defined as the distance, measured along axis A-B, between the first and second open ends 32, 34 of the outer gas flow passage 30.

The coolant flow passage 36 in FIG. 1 is enclosed within a cooling jacket 42 in the form of a cylindrical shell which extends along the axis A-B. The cooling jacket 42 surrounds, and is sealingly connected to, the outer shell 28, such that the outer shell 28 defines an inner wall of the coolant flow passage 36. The coolant flow passage 36 therefore comprises the annular space between the cooling jacket 42 and the outer shell 28. Therefore, in the embodiment of FIG. 1, the coolant flow passage 36 is located outwardly of the outer shell 28, such that the coolant circulating through coolant flow passage 36 is in direct heat exchange communication with only the outer gas flow passage 30, being separated from the gas in passage 30 by only the outer shell 28. Therefore, most of the heat transfer from the gas to the coolant takes place as the gas flows through the outer gas flow passage 30.

The flow of gas through heat exchanger 10 may be reversed so that the gas flows along axis A-B in the direction from B to A. Where the gas flow is reversed, the first open ends 16 and 32 of the gas flow passages 14 and 30 are located downstream of the second open ends 18 and 34, the second open end 34 of the outer gas flow passage 30 defines the inlet opening of heat exchanger 10, and the first open end 16 of the inner gas flow passage defines the outlet of heat exchanger 10. Also, when the gas flow is reversed, the first open end 24 of intermediate gas flow passage 22 is located upstream of the second open end 26. Where the gas flow is reversed, the inlet opening is identified by reference 4 and the outlet opening is identified by reference 2.

As shown in FIG. 1, the gas flow changes direction twice as it flows through heat exchanger 10. In order to accomplish these changes in direction, the heat exchanger 10 incorporates a pair of turnaround plenums, and these are now described below with reference to FIG. 1.

Firstly, as shown in FIG. 1, the upstream end of the intermediate shell 20 extends past the second open ends of the 18, 26 of the inner and intermediate gas flow passages 14, 22 and includes an inwardly extending wall portion 44 which is spaced from the second open ends 18, 26 of the inner and intermediate gas flow passages 14, 22, so as to define a first turnaround plenum 46 in which the gas changes direction between the inner and intermediate gas flow passages 14, 22. In the embodiment of FIG. 1, the inwardly extending wall portion 44 is located downstream of the second open end 18 and upstream of the second open end 26 and is simply shown as a solid, radially extending wall which is free of perforations, and which directs all of the gas exiting the inner gas flow passage 14 to change direction and enter the intermediate gas flow passage 22. Thus, the heat exchanger 10 does not permit the gas to bypass the intermediate and outer gas flow passages 22, 30 where heat is transferred to the coolant in the coolant passage 36.

A second turnaround plenum is provided between the first open end 24 of the intermediate gas flow passage 22 and the first open end 32 of the outer gas flow passage 30. In order to create this second turnaround plenum 48, the outer shell 28 extends past the first open ends 24, 32 of the intermediate and outer gas flow passages 22, 30 and includes an inwardly extending wall portion 50 which is spaced from the first open ends 24, 32 of the intermediate and outer gas flow passages 22, 30. The inwardly extending wall portion 50 has a central opening 51 within which the inner shell 12 is received and sealingly connected. The inwardly extending wall portion 50 therefore directs all of the gas exiting the intermediate gas flow passage 22 to change direction and enter the outer gas flow passage 30.

The heat exchanger 10 can be used in the cooling of various gas streams, such as intake air or exhaust gases in a motor vehicle. Where the gas being cooled is an exhaust gas, a catalytic converter may also be present in the exhaust system. The annular structure of heat exchanger 10 lends itself to integration with a catalytic converter, thereby permitting a reduction in the number of components of the exhaust system and providing potential opportunities for temperature control of the catalyst contained in the catalytic converter. For example, in heat exchanger 10 the inner shell 12 may comprise the housing of a catalytic converter and a catalyst 52 may be provided in the inner gas flow passage 14.

Where the heat exchanger 10 comprises an integrated device for cooling and catalytic treatment of exhaust gases, the direction of gas flow may be from A to B as shown in FIG. 1, in which case the exhaust gases flow through the catalyst 52 prior to being cooled by heat exchange with the liquid coolant. It may, however, be preferred to pre-cool the exhaust gases before they contact the catalyst 52, for example where the temperature of the catalyst must be maintained within a specific temperature range. The heat exchanger 10 may be used in such situations, for example by reversing the gas flow through the heat exchanger so that the overall flow of gas through heat exchanger is from B to A, as described above. In this reverse flow configuration, the exhaust gas is cooled by the coolant prior to passing through the catalyst 52, thereby providing the ability to control the temperature of the catalytic converter. Temperature control of the catalyst 52 can alternatively, or additionally, be provided, by controlling the flow of coolant through the heat exchanger 10.

It can be seen from FIG. 1 and the above discussion that integration of the heat exchanger 10 with a catalytic converter eliminates one component from the exhaust system. The addition of the intermediate shell 20, outer shell 28 and cooling jacket 42 to the outer surface of a catalytic converter can be done without requiring significantly more space than is already required by the catalytic converter alone. Because the intermediate and outer gas flow passages 22, 30 and the coolant flow passage 36 are annular, a relatively large surface area for cooling can be accommodated within a relatively small diameter (i.e. volume). In addition to having a large surface area to volume ratio, the heat exchanger 10 also provides a large flow section relative to volume, which is favourable for maximizing heat exchange per unit volume. These advantages are possessed by heat exchanger 10 and also the heat exchangers according to other embodiments of the invention, which will be described below.

Furthermore, because the coolant flow passage 36 is located on the outside of the heat exchanger 10, the use of this structure may eliminate the need for an external heat shield, which may bring about a further reduction in the number of components and space requirements.

Figures 2A, 2B:
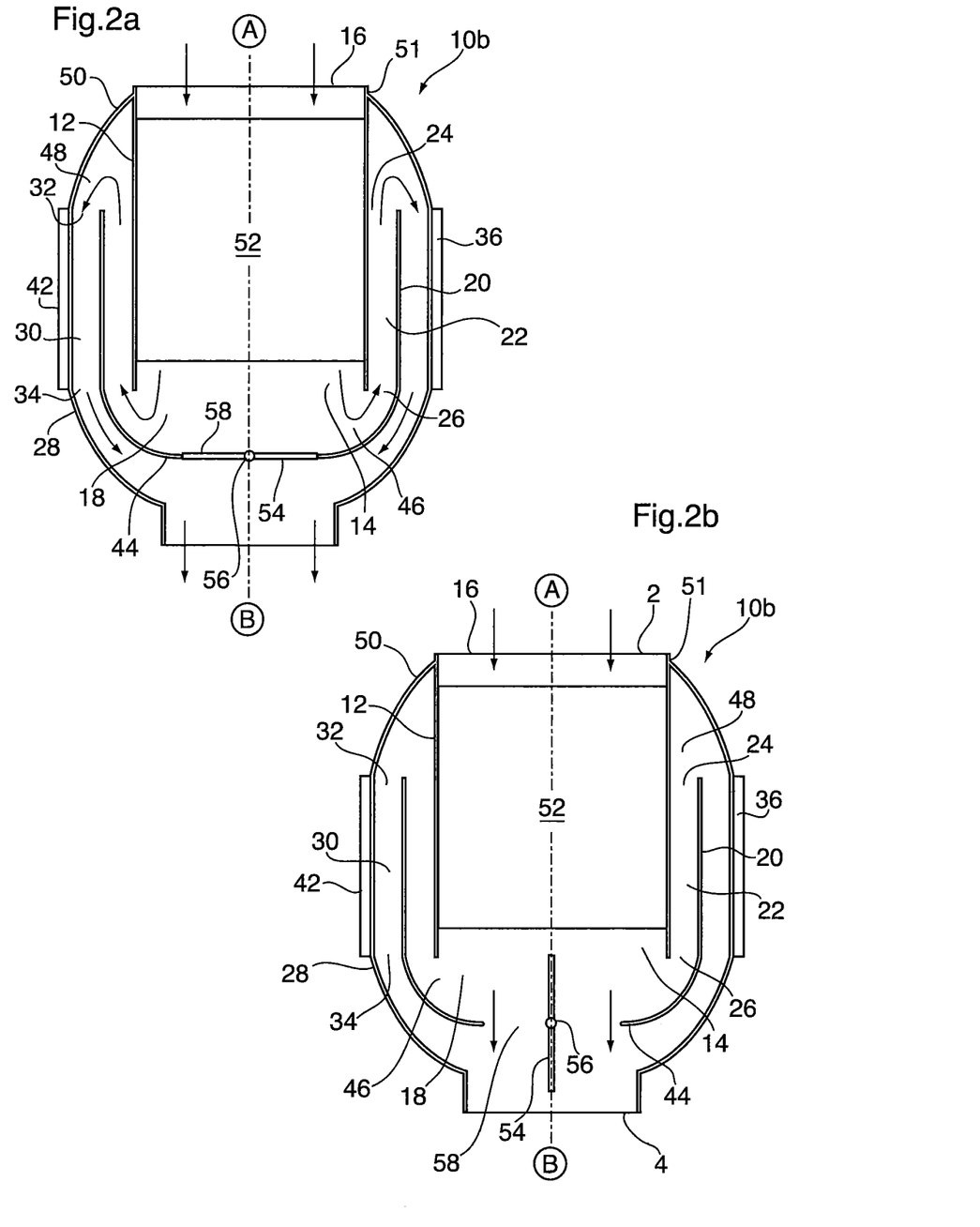
FIGS. 2a and 2b are schematic, axial cross-sections through an annular heat exchanger according to a second embodiment of the invention.
Figure 3:
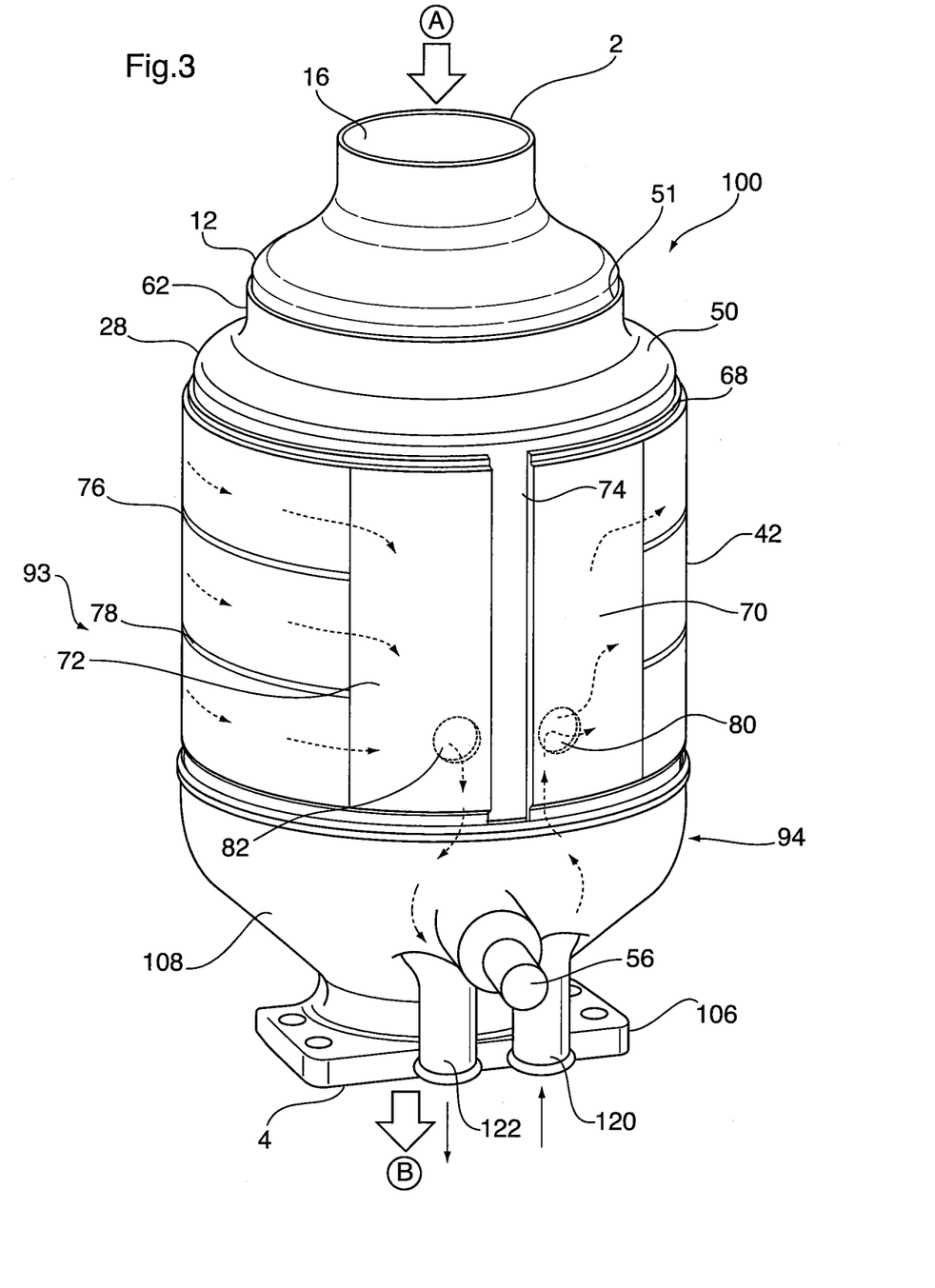
FIG. 3 is a perspective view of an exhaust gas heat recovery device incorporating an annular heat exchanger according to a third embodiment of the invention.

In some embodiments of the invention, some or all of the gas flow is allowed to selectively bypass the intermediate and outer gas flow passages 22, 30, and thereby flow through heat exchanger 10 without being significantly cooled by the liquid coolant in coolant passage 36. FIGS. 2a and 2b schematically illustrate a heat exchanger 10b according to a second embodiment of the invention. Heat exchanger 10b is similar to heat exchanger 10 described above and includes a number of components which are similar or identical to the components of heat exchanger 10. Therefore, the components of heat exchanger 10b are identified with like reference numerals, and the above description of the elements of heat exchanger 10 apply equally to like elements of heat exchanger 10b.

The heat exchanger 10b differs from heat exchanger 10 in that the inwardly extending wall portion 44 of the intermediate shell 20 is provided with a bypass valve including a valve element 54 which can be partly or completely opened. The bypass valve can be of any convenient form. In heat exchanger 10b, the bypass valve comprises a butterfly valve in which the valve element 54 comprises a disc mounted on a transversely extending rod 56 which pivots the valve element 54 in a circular opening 58. The rod 56 extends outwardly of the valve and its operation may be controlled by an external controller (not shown) based on a number of operating parameters, such as the temperature of the exhaust gas or a heating requirement in the vehicle.

In FIG. 2b the valve element 54 is aligned with axis A-B, and therefore the bypass gas flow through opening 58 is at a maximum. This has the effect of reducing heat exchange with the coolant in passage 36 since very little of the exhaust gas will flow through the intermediate and outer gas flow passages 22, 30. The valve element 54 may be completely opened, for example, once the vehicle's engine coolant has reached a desired operating temperature and further heat transfer to the coolant is not required.

When completely closed, the valve element 54 completely blocks bypass gas flow (FIG. 2a), and all the gas is then forced to flow through the intermediate and outer gas flow passages 22, 30 where it transfers heat to the coolant circulating within the coolant flow passage 36. This is essentially identical to the flow through heat exchanger 10 of FIG. 1. The valve element 54 may be closed, for example, when it is desired to quickly heat the engine coolant on initial start-up of the vehicle.

The valve element 54 may adopt positions which are intermediate those shown in FIGS. 2a and 2b, such that a portion of the gas flows through the intermediate and outer gas flow passages 22, 30, and a portion of the gas bypasses the heat exchanger portion of heat exchanger 10 by flowing through the bypass port 58 and exiting the heat exchanger 10b. When the valve is partly open, the valve element 54 is at an angle of greater than 0° and less than 90° relative to the axis A-B.

In addition to providing all the benefits of heat exchanger 10 described above, the provision of heat exchanger 10b with a bypass valve eliminates the need for an external bypass conduit to be incorporated into the exhaust system, which further reduces the number of components and space requirements of the exhaust system.

Although not shown in FIG. 1, 2a or 2b, at least one of the intermediate gas flow passage 22 and the outer gas flow passage 30 may be provided with turbulence-enhancing inserts, such as corrugated fins or turbulizers, so as to improve heat transfer with the coolant. This is discussed in more detail below with reference to other embodiments of the invention.

FIGS. 3 to 6 illustrate a heat exchanger 100 in accordance with a third embodiment of the invention. Heat exchanger 100 incorporates many of the same elements as are present in heat exchangers 10 and 10b described above. Accordingly, these like elements of heat exchanger 100 are numbered using like reference numerals and the above description of the elements of heat exchanger 10 applies equally to like elements of heat exchanger 100.

Figure 4:
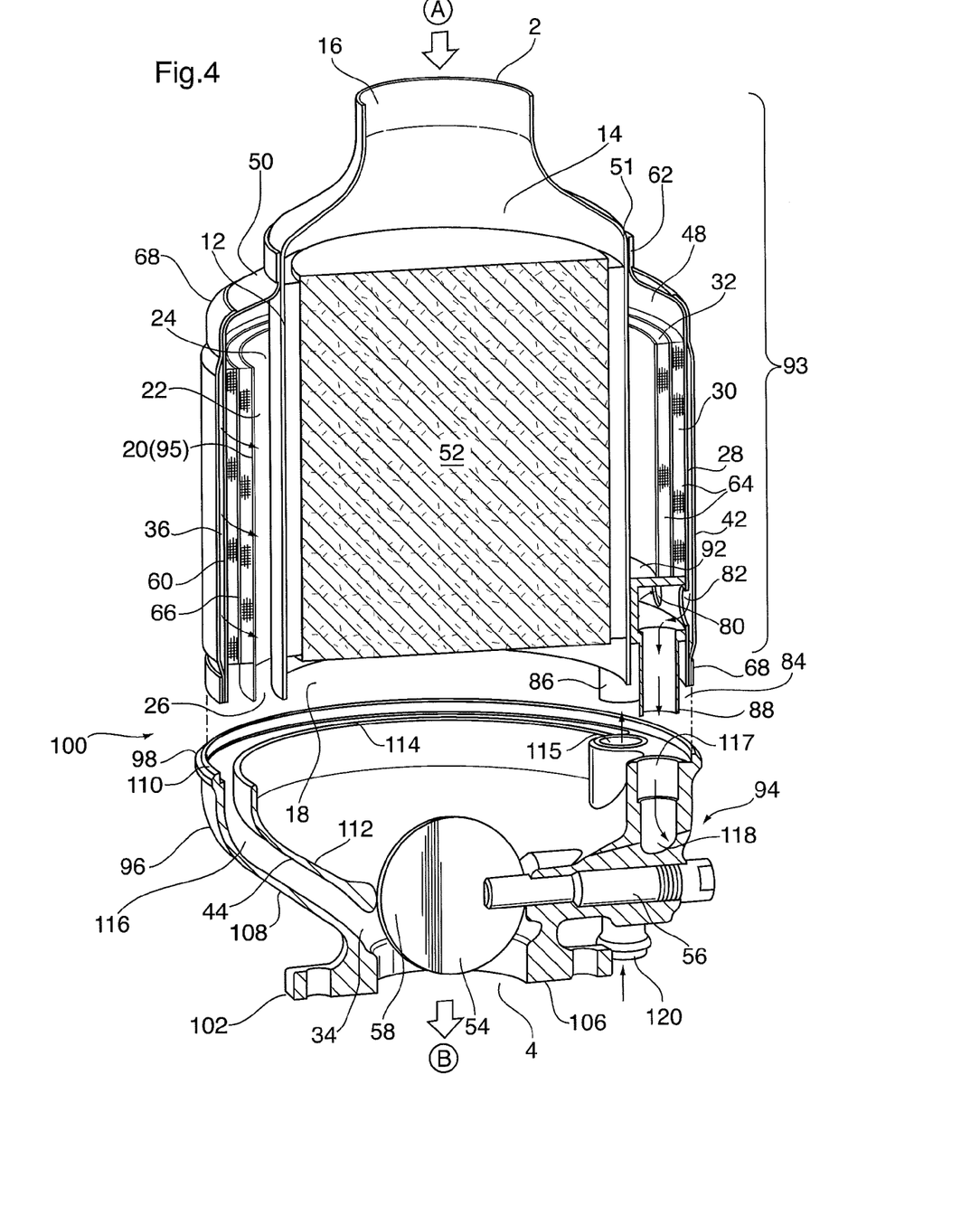
FIG. 4 is an axial cross-section through the exhaust gas heat recovery device of FIG. 3, showing the device in a partially assembled state.

Heat exchanger 100 is integrated with a catalytic converter and, as shown in FIG. 4, is comprised of two main sections: a heat exchange and catalytic converter section 93, and a liquid-cooled valve section 94. Heat exchanger 100 is similar to heat exchangers 10 and 10b shown above in that it includes an inner shell 12 (also serving as the catalytic converter housing), an intermediate shell 20 surrounding the inner shell 12, an outer shell 28 surrounding the intermediate shell 20, and a cooling jacket 42 surrounding the outer shell 28. The overall direction of gas flow through heat exchanger 100 is from A to B. The inner shell 12 has a straight, cylindrical portion and is narrowed at its upstream end (closest to A) to define the inlet opening 2 of heat exchanger 100. The inlet opening may be provided with a flange or other connection means (not shown) for attachment to other exhaust system components. The intermediate shell 22 comprises an open-ended cylindrical portion 95 having straight, axially extending side walls, and being of constant diameter. The outer shell 30 includes a cylindrical portion 60 having a constant diameter which is greater than the diameter of the intermediate shell 20 so as to create an annular space between the intermediate and outer shells 20, 28 which defines the outer gas flow passage 30. The outer shell 28 also includes inwardly extending wall portion 50 located at its upstream end which reduces the diameter of the outer shell 28 and terminates in an annular, axially extending collar 62 surrounding opening 51. The collar 62 is sealingly connected to the outer surface of the inner shell 12 (catalyst housing), for example by brazing or welding.

To optimize heat transfer between the hot gases flowing through the outer gas flow passage 30 and the coolant circulating in coolant flow passage 36, the outer gas flow passage 30 may be provided with turbulence-enhancing structures, such as corrugated fins or turbulizers in order to create turbulence in the gas flow and improve heat transfer with the coolant. These turbulizers are only schematically shown in FIGS. 3 to 6 and are identified by reference numeral 64. The turbulizers 64 are in the form of sheets which are wrapped around the intermediate shell 20 and substantially completely fill the annular space between shells 20 and 28 in which the outer gas flow passage 30 is defined.

The turbulizers 64 may comprise offset or lanced strip fins of the type described in U.S. Pat. No. Re. 35,890 (So) and U.S. Pat. No. 6,273,183 (So et al.). The patents to So and So et al. are incorporated herein by reference in their entireties. The offset strip fins may be received within the outer gas flow passage 30, such that the low pressure drop direction of the fin (i.e. with the fluid encountering the leading edges of the corrugations) is oriented in the axial direction. With the fin in this orientation there is a relatively low pressure drop in the axial flow direction and a relatively high pressure drop in the transverse, or circumferential, flow direction. In the offset strip fin the axially-extending ridges defining the corrugations are interrupted along their length, so that the axially-extending spaces are tortuous and create turbulence in the gas flow. It will be appreciated, that an offset strip fin could instead be oriented such that the high pressure drop orientation of the fin (i.e. with the fluid encountering the side surfaces of the corrugations) is oriented in the axial direction.

In the embodiment shown in FIG. 4, the height of the outer gas flow passage 30 (measured radially) is sufficient to accommodate two layers of turbulizer 64 arranged one on top of the other, with a thin separator sheet 66 between them.

It will be noted that turbulizers 64 are not provided in the intermediate gas flow passage 22 of heat exchanger 100. Since the cooling jacket 42 is provided on the outer surface of the outer shell 28, only the gas flowing through the outer gas flow passage 30 is in direct heat exchange communication with the coolant circulating within coolant flow passage 36. In this configuration, there will be little heat exchange between the coolant and the gas flowing through the intermediate gas flow passage 22, and the intermediate gas flow passage 22 may be regarded as a return passage. Any additional heat transfer provided by including turbulence-enhancing structures in the intermediate gas flow passage 22 would be outweighed by hydraulic resistance caused by the turbulence-enhancing structure.

The outer gas flow passage 30 may be provided with other types of turbulence-enhancing structures instead of turbulizers 64. For example, one or both of the intermediate shell 20 and the outer shell 28 may be provided with protrusions (not shown), such as ribs or dimples, which project into the outer gas flow passage 30 and are arranged to create a tortuous gas flow path within the passage 30.

The cooling jacket 42 of heat exchanger 100 extends axially along substantially the entire length of the cylindrical portion of outer shell 28, and is provided with a continuous peripheral flange 68 by which it is sealingly connected to the outer surface of the outer shell 28, for example by brazing or welding. Cooling jacket 42 of heat exchanger 100 is constructed so as to promote a circumferential flow of liquid coolant throughout the coolant flow passage 36. Accordingly, the cooling jacket 42 is provided with a pair of manifolds 70, 72 which permit the coolant to be distributed axially throughout the coolant flow passage 36. Where the manifolds 70, 72 are arranged side-by-side as in heat exchanger 100, an additional structure is provided to prevent short circuiting of the coolant flow between the two manifolds 70, 72. For example, in heat exchanger 100, the manifolds 70, 72 are separated by an axial rib 74 which extends radially inwardly to the outer surface of the outer shell 28 and physically separates the manifolds 70, 72. In addition, the cooling jacket 42 is provided with a pair of circumferential ribs 76, 78 which extend radially inwardly to the outer surface of the outer shell 28, so as to improve the pressure resistance of the cooling jacket 42. It will be appreciated that side-by-side location of manifolds 70, 72 is not required. Rather, the manifolds may be spaced apart from one another by an angle of up to about 180 degrees.

The manifolds 70, 72 are connected to coolant conduits (not shown) of a coolant circulation system. For example, the manifolds 70, 72 could be provided with inlet and outlet openings formed in cooling jacket 42 and provided with fittings 38, 40, as in heat exchanger 10. However, due to the incorporation of a specific type of valve, described below, the coolant flow passage 36 is provided with coolant inlet and outlet openings 80, 82 formed in the outer shell 28, and located so as to communicate with the interiors of manifolds 70 and 72, respectively. The inlet and outlet openings are formed proximate to the downstream end of the outer shell 28.

Figure 5:
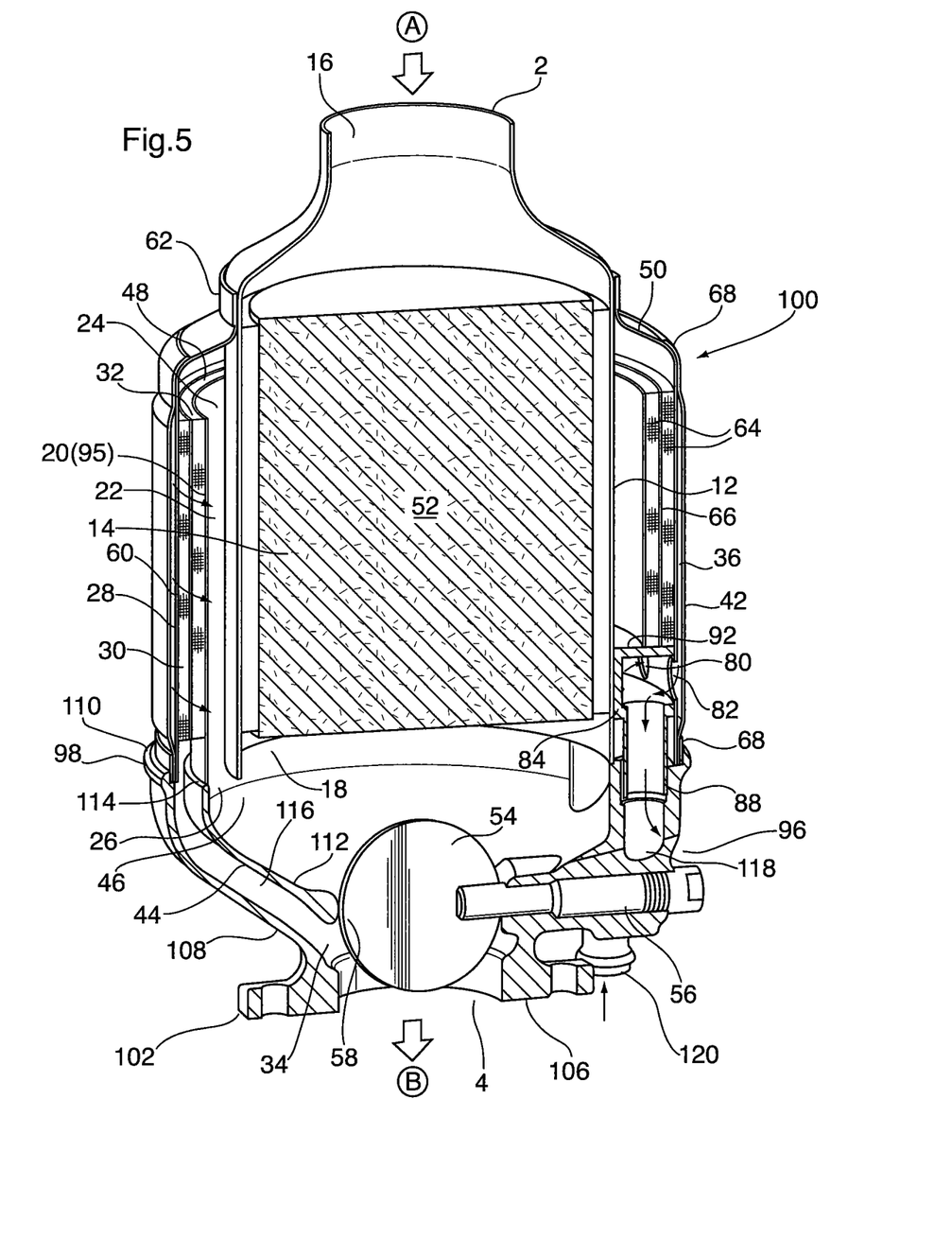
FIG. 5 is an axial cross-section similar to FIG. 4, showing the heat recovery device in a fully assembled state.
Figure 6:
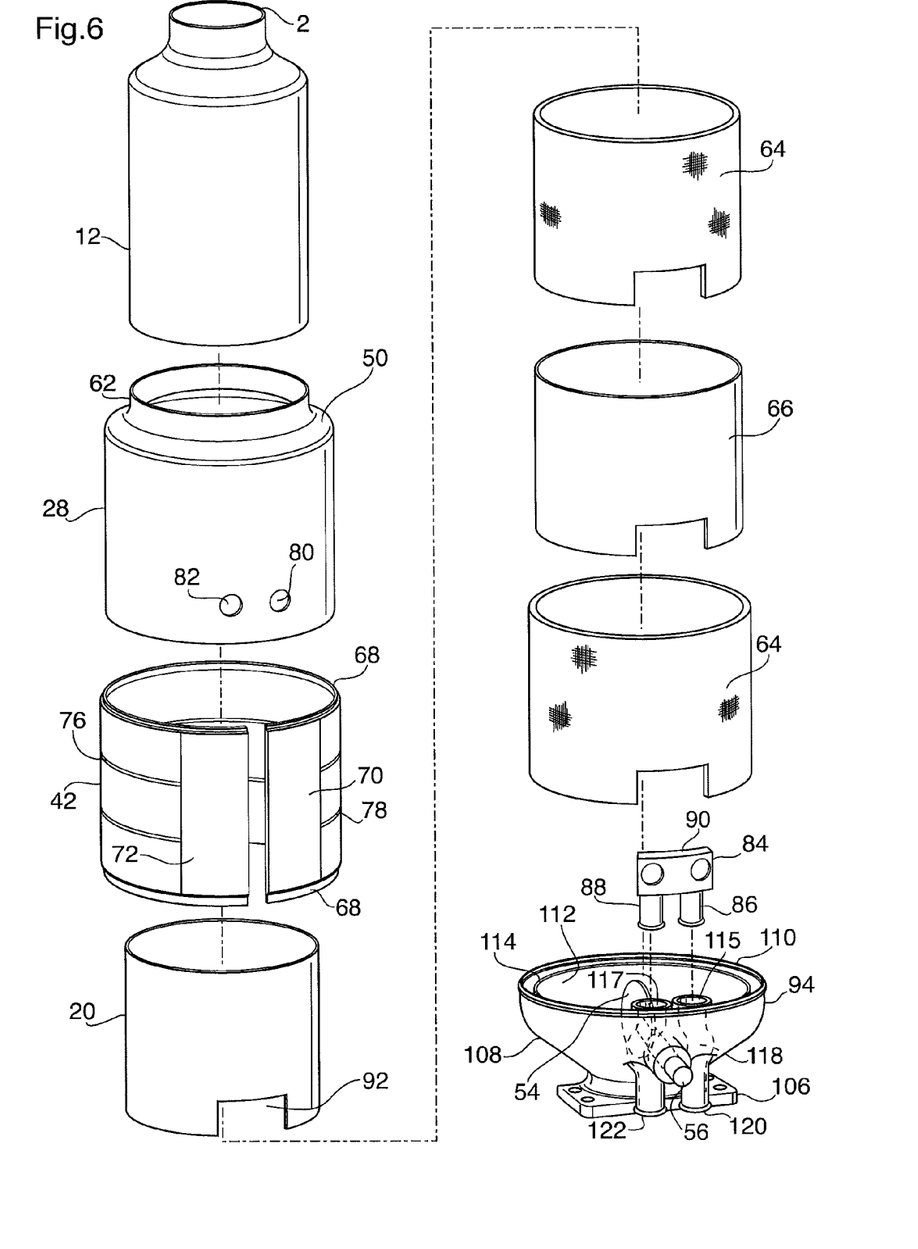
FIG. 6 is an exploded view illustrating the components of the exhaust gas heat recovery device of FIG. 3.

As best seen in FIGS. 4 and 5, the heat exchanger 100 further comprises a fitting block 84 including coolant fittings 86, 88 which are in communication with the coolant openings 80, 82 and which provide means for connecting the coolant flow passage 36 with the vehicle's cooling system. The fitting block 84 includes an arcuate outer surface 90 which is sealingly connected to the inner surface of the outer shell 28, for example by brazing or welding. The body of the fitting block 84 is accommodated within a rectangular cutout 92 in the downstream end of the intermediate shell 20.

The coolant fittings 86, 88 of heat exchanger 100 extend along axis A-B so as to connect to coolant passages within the valve section 94, which comprises a valve body 96 having a first (upstream) end 98 at which it is attached to the heat exchange and catalytic converter section 93 of heat exchanger 100, and a second (downstream) end 102 defining the outlet opening 4 of heat exchanger 100, the second end 102 being provided with an outlet flange 106 for connection to other exhaust system components (not shown).

The valve body 96 includes an outer sidewall 108 extending from the first end 98 to the second end 102 of valve body 96 and defining an outer circumferential lip 110 at the first end 98 of valve body 96. The open downstream end of outer shell 28 and the outer circumferential lip 110 overlap and are sealingly connected about their entire circumference, for example by brazing or welding.

The valve body 96 also includes an inner sidewall 112 extending from the first end 98 of valve body 96 to proximate the second end 102 thereof, and defining an inner circumferential lip 114 at the first end 98 of valve body, which is concentric with outer lip 110. The cylindrical portion 95 of intermediate shell 20 overlaps and is sealingly connected to the inner circumferential lip 114 about its entire circumference. A space 116 between the inner and outer sidewalls 112, 108 comprises a partial annulus and forms part of the outer gas flow passage 30 which is in communication with the outlet opening 4.

It will be apparent from FIG. 5, the assembled view of heat exchanger 100, that the intermediate shell 20 comprises both the inner sidewall 112 of the valve body 96 and the cylindrical portion 95. The inwardly extending wall portion 44 of inner shell 20 and the circular opening 58 are both defined by the inner sidewall 112.

Like heat exchanger 10b, the circular opening 58 in the inwardly extending wall portion 44 is selectively opened and closed by disk-like valve element 54 mounted on pivoting rod 56 so as to selectively open and close the opening 58, and thereby control the bypass flow of gas through the heat exchanger 100. With the valve 54 completely closed, all of the gas entering heat exchanger 100 through inlet 2 flows through inner gas flow passage 14 and passes through catalyst 52. The gas then changes direction in the first turnaround plenum 46 created by the inwardly extending wall portion 44 of intermediate shell 20, and because valve 54 is closed, the gas is caused to flow through intermediate and outer gas flow passages 22, 30, after which the cooled gases exiting the outer gas flow passage 30 pass through the space 116 and exit heat exchanger 100 through outlet 4. With the valve 54 completely open as in FIG. 5 substantially all of the gas flowing through the inner gas flow passage 14 will flow through opening 58 and exit the heat exchanger through outlet 4, without being cooled by the coolant circulating in passage 36.

The valve body 96 also includes an internal cooling jacket 118. The axially extending fittings 86, 88 of fitting block 84 are received in overlapping, sealed engagement with corresponding axial openings 115, 117 in the valve body 96 which are in communication with an internal cooling jacket 118 which circulates the coolant in the vicinity of the pivot rod 56. The internal cooling jacket 118 of valve body 96 is formed between the inner and outer sidewalls 112, 108 and interrupts the gas flow space 116 between the inner and outer sidewalls 112, 108. The internal cooling jacket 118 is in flow communication with the vehicle's cooling system through inlet and outlet fittings 120 and 122, best seen in FIG. 6.

A heat exchanger 200 according to a fourth embodiment of the invention is now described below with reference to FIGS. 7 to 9. Heat exchanger 200 incorporates many elements which are either the same as or similar to elements of heat exchangers 10, 10a and 100 described above. Like elements of heat exchanger 200 are therefore described by like reference numerals, and the above descriptions of these elements apply equally to the like elements of heat exchanger 200.

Heat exchanger 200 includes an inner shell 12, an intermediate shell 20 and an outer shell 28 which are arranged in spaced relation to one another, so as to define an inner gas flow passage 14, an intermediate gas flow passage 22 and an outer gas flow passage 30, all as described above. Heat exchanger 200 integrates the functions of a heat exchanger and a catalytic converter, and therefore includes a catalyst 52 in the inner gas flow passage 14, and the inner shell 12 of the heat exchanger 200 is also the housing of the catalytic converter. The overall direction of gas flow through heat exchanger 200 is from A to B, having an inlet opening 2 and an outlet opening 4.

Heat exchanger 200 differs from the heat exchangers 10, 10b and 100 described above in that the coolant flow passage 36 of heat exchanger 200 is located inwardly of the outer shell 28. In this regard, the coolant flow passage 36 of heat exchanger 200 is incorporated in the intermediate shell 20, which includes an axially extending double-walled cylindrical portion comprised of an inner jacket wall 124 and an outer jacket wall 126. The inner and outer jacket walls 124, 126 are spaced apart from one another and are sealingly joined together at their edges to define a cooling jacket in which coolant flow passage 36 is enclosed. In addition, the outer jacket wall 126 is provided with a pair of openings 128, 130 which provide an inlet and outlet for the coolant circulating through flow passage 36. The openings 128, 130 are provided with fittings 132, 134 which extend radially outwardly from the outer jacket wall 126, through the outer gas flow passage 30 and through apertures 136, 138 in the outer shell 28, to connect with the vehicle's cooling system. The fittings 132, 134 are therefore sealingly connected to both the outer jacket wall 126 and to the peripheral edges of the apertures 136, 138 in the outer shell 28, for example by brazing or welding.

One advantage of providing the coolant flow passage 36 within the intermediate shell 20 is that the coolant flow passage 36 is located between the intermediate gas flow passage 22 and the outer gas flow passage 30, and is therefore in heat exchange communication with gases flowing through both passages 22 and 30. In order to enhance heat transfer, both the intermediate gas flow passage 22 and the outer gas flow passage 30 may be provided with at least one layer of turbulizer 64.

Figure 8:
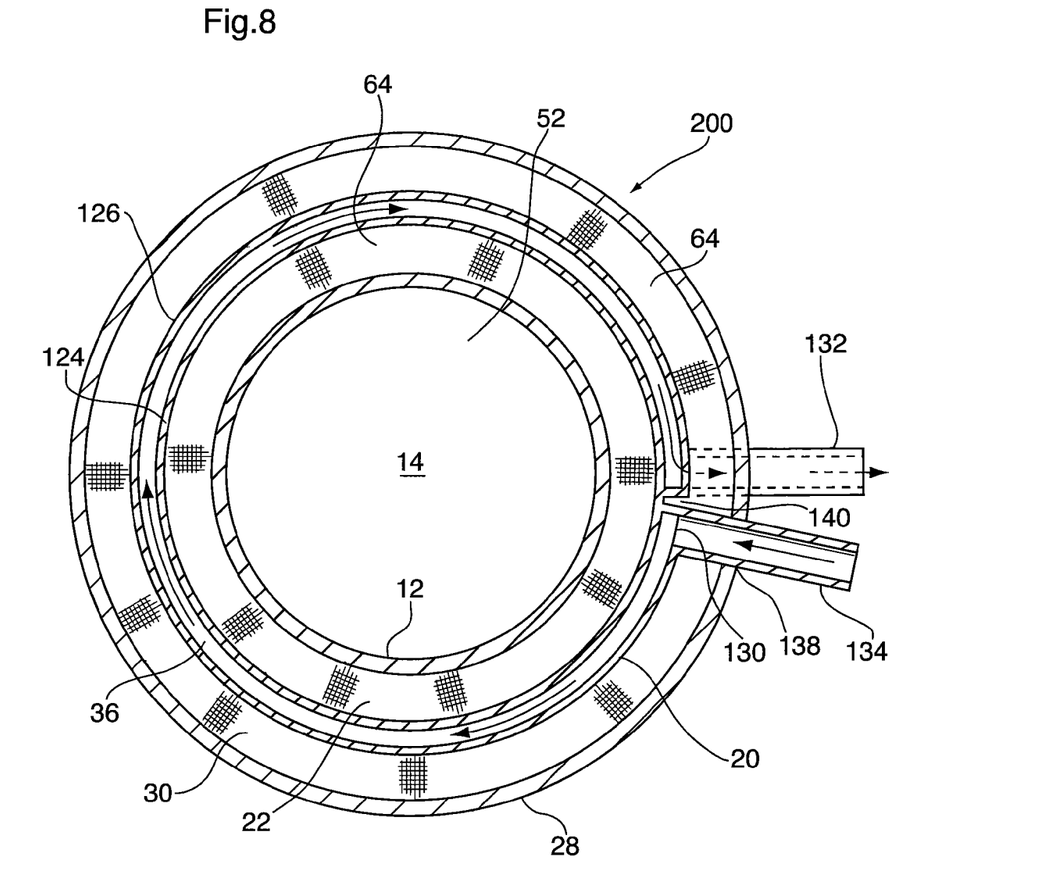
FIG. 8 is a radial cross-section along line 8-8 of FIG. 7.
Figure 9:
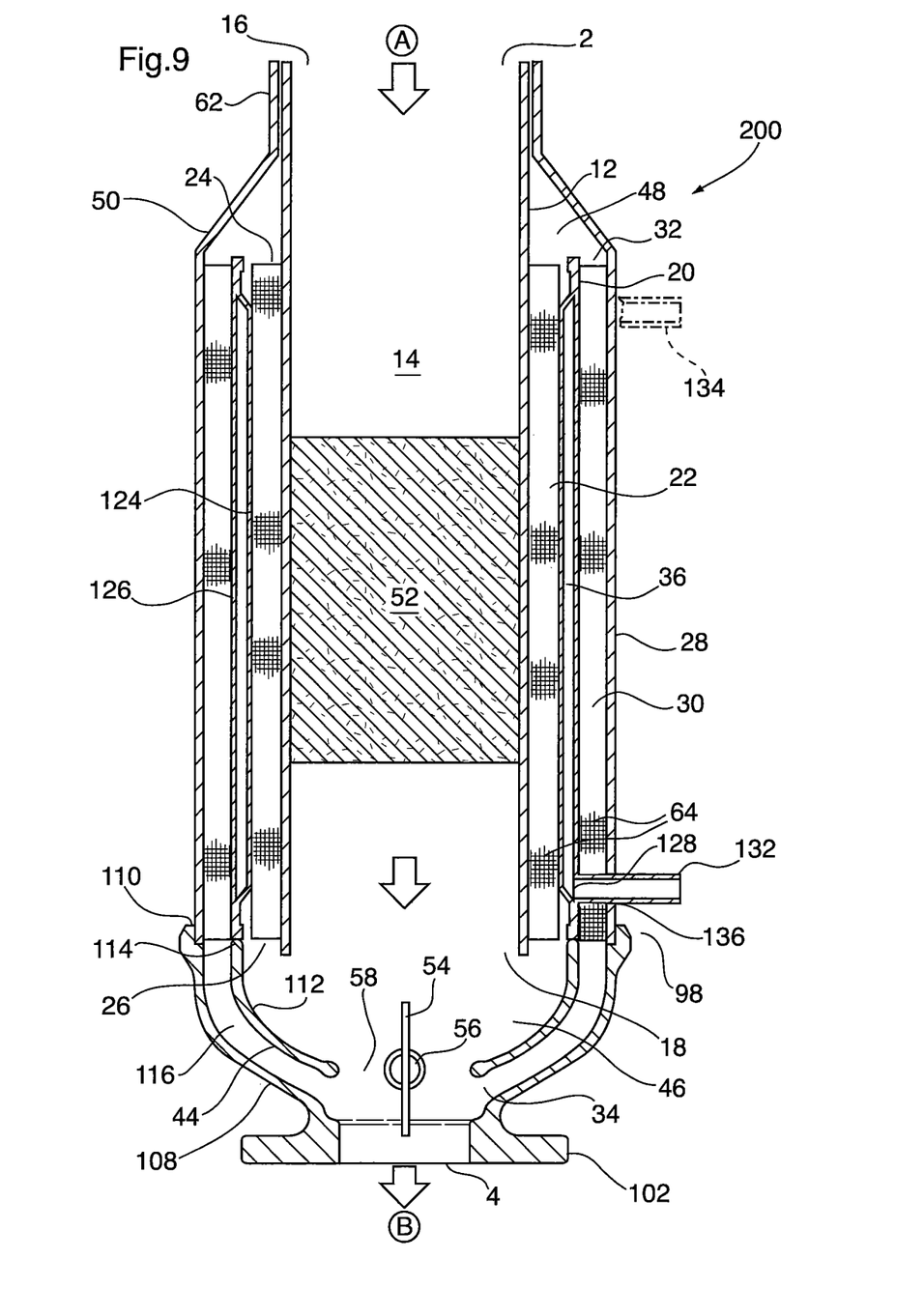

FIG. 8 illustrates a possible position of the inlet and outlet fittings 132, 134 for the coolant flow passage 36. As shown in FIG. 8, the inlet and outlet fittings 132, 134 and corresponding openings 128, 130 may be located close together circumferentially, with an axial rib 140 or other means to prevent short-circuiting of flow between the inlet and outlet 128, 130. As indicated by the arrows in FIG. 8, the coolant flows circumferentially between the inlet and outlet 128, 130. The inlet and outlet 128, 130 and the corresponding fittings 132, 134 are not necessarily located as in FIG. 8, but may instead be spaced apart circumferentially by up to about 180 degrees.

As with heat exchangers 10b and 100 described above, the intermediate shell 20 of heat exchanger 200 includes an inwardly extending wall portion 44 having an opening 58 which is selectively closed by a valve element 54 mounted on a pivoting rod 56.

Similar to heat exchanger 100, the outlet end of heat exchanger 200 includes an outer sidewall 108 which extends inwardly proximate the outlet end 4 of heat exchanger 200, and terminates in a flange 106 for connection of the heat exchanger 200 to another exhaust system component. A space 116 of annular cross-section is formed between the outer sidewall 108 and an inner sidewall 112, comprising the inwardly extending wall portion 44 of the intermediate shell 20, forming part of the outer gas flow passage 30 and providing communication between the outer gas flow passage 30 and the outlet opening 4 of heat exchanger 200.

Figure 7:
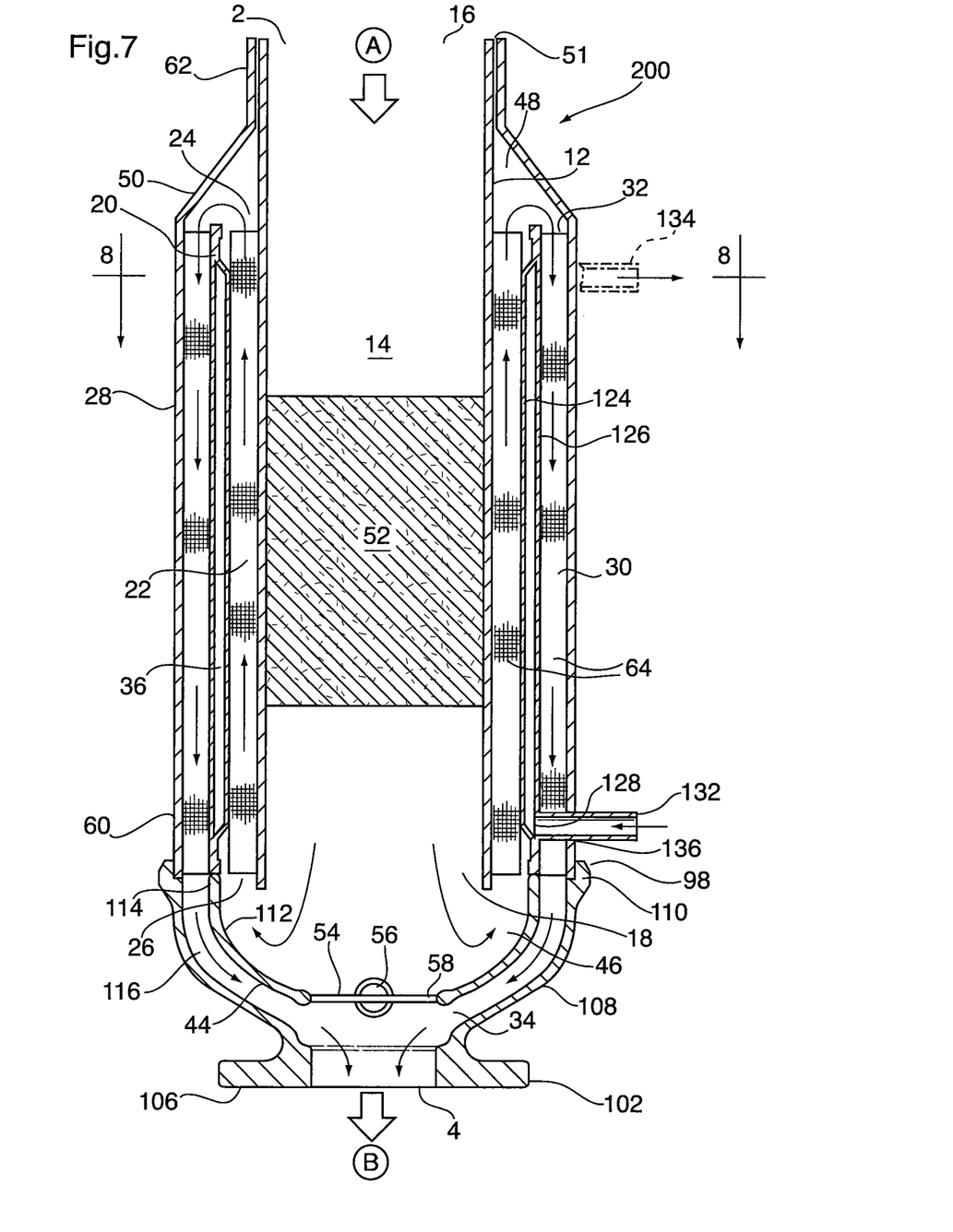
FIGS. 7 and 9 are axial cross-sections through an exhaust gas heat recovery device according to a fourth embodiment of the invention.

With the valve element 54 closed as in FIG. 7, all the gas entering the heat exchanger 200 through inlet opening 2 is caused to change direction and flow through the intermediate and outer gas flow passages 22, 30, transferring heat to the coolant being circulated in the coolant passage 36 before exiting the heat exchanger through outlet opening 4. With the valve element 54 completely open as in FIG. 9, substantially all of the gas entering the heat exchanger through inlet opening 2 will flow through opening 58 of the bypass valve and out through the outlet opening 4, bypassing the intermediate and outer gas flow passages.

Figures 10, 11:
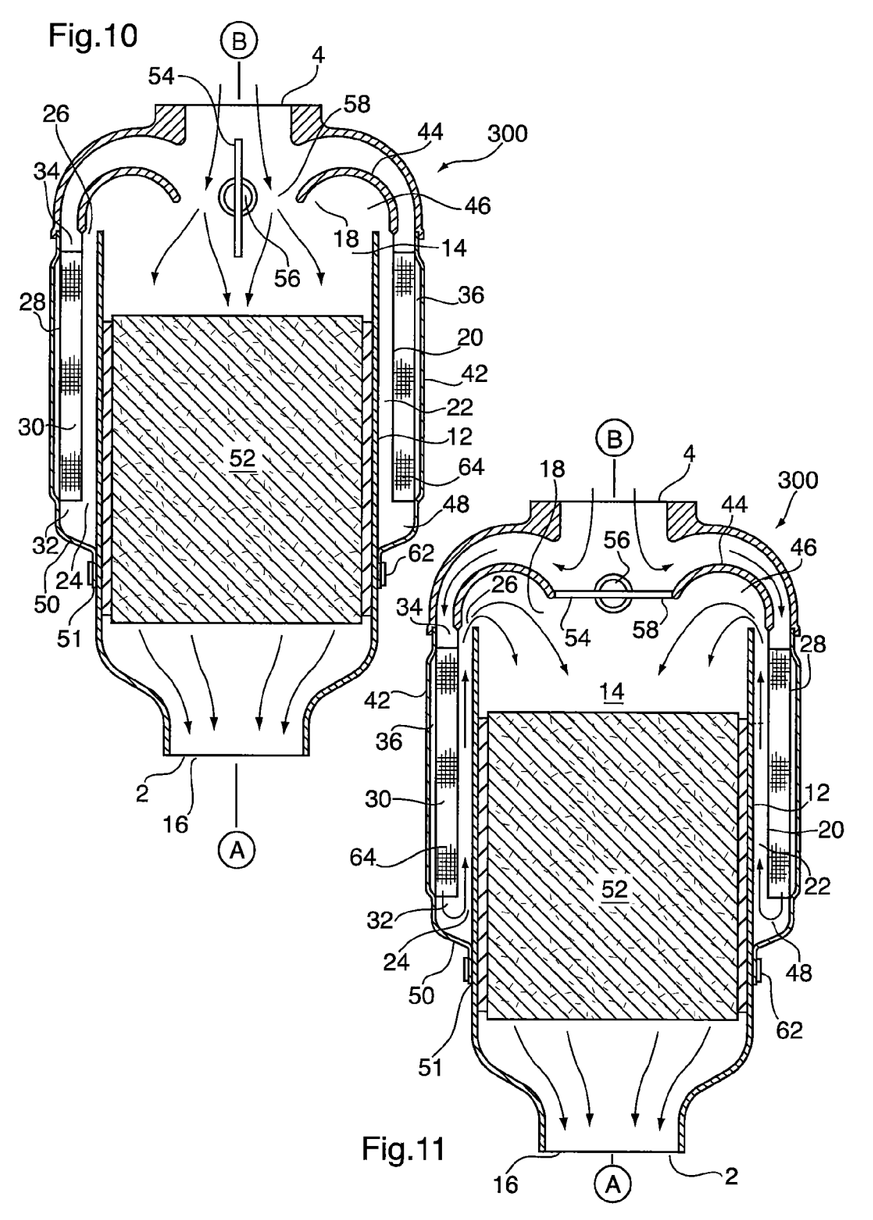
FIGS. 10 and 11 are schematic, axial cross-sections of an exhaust gas heat recovery device incorporating a heat exchanger according to a fifth embodiment of the invention.

FIGS. 10 and 11 illustrate yet another heat exchanger 300 according to the invention, the heat exchanger 300 including many of the same elements as described above in connection with heat exchangers 10, 10b, 100 and 200. Accordingly, the like elements of heat exchanger 300 are numbered using like reference numerals and the above description of the elements of heat exchangers 10, 10b, 100 and 200 applies equally to like elements of heat exchanger 300.

Heat exchanger 300 bears a high degree of similarity to heat exchanger 10b, the main difference being that the overall direction of gas flow in heat exchanger 300 is from B to A, opposite that of heat exchanger 10b, such that the inlet opening of heat exchanger 300 is at 4 and the outlet opening of heat exchanger 300 is at 2. Thus, as shown in FIG. 11, when the valve 54 is closed, the gas entering the heat exchanger 300 through inlet opening 4 is caused to flow through the outer and intermediate gas flow passages 30, 22 before passing through the catalyst 52. When the valve 54 is open as in FIG. 10, substantially all of the gas flow passes from the inlet opening 4, through the catalyst 52, and out through the outlet opening 2 without being cooled. Therefore, by selectively cooling the exhaust gas before it comes into contact with the catalyst 52, the heat exchanger 300 provides a means for controlling the temperature of the catalyst 52.

Although the invention has been described in the context of heat exchangers for cooling a gas stream with a liquid coolant, it will be appreciated that the heat exchangers according to the invention could instead be used for transferring heat from a heated liquid to a relatively cool gas.

Although the invention has been described in connection with certain embodiments thereof, it is not limited thereto. Rather, the invention includes all embodiments which may fall within the scope of the following claims.

What is claimed is:

1. An integrated heat recovery device, comprising:
(a) a heat exchanger having a first end with a first gas flow opening and a second end with a second gas flow opening, wherein the first and second ends of the heat exchanger are spaced apart along a gas flow axis, and wherein the heat exchanger comprises:
an inner shell defining an inner gas flow passage extending along the gas flow axis, wherein the inner gas flow passage has a first open end and a second open end, wherein the first open end of the inner gas flow passage is in flow communication with the first gas flow opening of the heat exchanger;
an intermediate shell surrounding the inner shell, wherein a space between the inner shell and the intermediate shell defines an intermediate gas flow passage extending along the gas flow axis, wherein the intermediate gas flow passage has a first open end and a second open end, and wherein the second open end of the intermediate gas flow passage is in flow communication with the second open end of the inner gas flow passage;

an outer shell surrounding the intermediate shell, wherein a space between the intermediate shell and the outer shell defines an outer gas flow passage extending along the gas flow axis, wherein the outer gas flow passage has a first open end and a second open end, wherein the first open end of the outer gas flow passage is in flow communication with the first open end of the intermediate gas flow passage and the second open end of the outer gas flow passage is in flow communication with the second gas flow opening of the heat exchanger; and a coolant flow passage defined by a cooling jacket attached to an outer surface of the outer shell, the coolant flow passage having an inlet and an outlet and extending along the gas flow axis, wherein the coolant flow passage is in heat exchange communication with the outer gas flow passage;

wherein the cooling jacket includes a pair of manifolds, one of the manifolds having an interior communicating with a coolant inlet opening formed in the outer shell, and the other of the manifolds having an interior communicating with a coolant outlet opening formed in the outer shell;

wherein the heat exchanger further comprises a fitting block including coolant fittings which are in communication with the coolant inlet and outlet openings of the outer shell; and wherein the intermediate shell includes a radially inwardly extending wall portion which is located between the second end of the heat exchanger and the second open ends of the inner and intermediate gas flow passages, wherein the radially inwardly extending wall portion of the intermediate shell defines a turnaround plenum in which the gas flow changes direction between the inner and intermediate gas flow passages; and (b) a valve provided in an opening in the radially inwardly extending wall portion of the intermediate shell;

wherein opening of the valve permits direct flow communication between the first and second gas flow openings through the inner gas flow passage, thereby providing a bypass flow passage for the gas; and wherein complete closing of the valve substantially prevents direct flow communication between the first and second gas flow openings through the inner gas flow passage.

2. The integrated heat recovery device according to claim 1, wherein the first end of the heat exchanger is upstream of the second end of the heat exchanger such that the first gas flow opening defines a gas inlet opening and the second gas flow opening defines a gas outlet opening; and wherein the first open end of the inner gas flow passage is upstream of the second end of the inner gas flow passage;

the first open end of the intermediate gas flow passage is downstream of the second end of said intermediate gas flow passage; and the first open end of the outer gas flow passage is upstream of the second end of the outer gas flow passage.

3. The integrated heat recovery device according to claim 1, wherein the first end of the heat exchanger is downstream of the second end of the heat exchanger such that the first gas flow opening defines a gas outlet opening and the second gas flow opening defines a gas inlet opening; and wherein the first open end of the inner gas flow passage is downstream of the second end of the inner gas flow passage;

the first open end of the intermediate gas flow passage is upstream of the second end of said intermediate gas flow passage; and the first open end of the outer gas flow passage is downstream of the second end of the outer gas flow passage.

4. The integrated heat recovery device according to claim 1, wherein the outer shell has a radially inwardly extending wall portion which is sealingly connected to the inner shell at a location between the first end of the heat exchanger and the first open ends of the intermediate and outer gas flow passages, wherein the radially inwardly extending wall portion of the outer shell defines a turnaround plenum in which the gas flow changes direction between the intermediate and outer gas flow passages.

5. The integrated heat recovery device according to claim 1, wherein said gas is a motor vehicle exhaust gas, and wherein the integrated heat recovery device further comprises:

(c) a catalyst provided in the inner gas flow passage for treating said motor vehicle exhaust gas.

6. The integrated heat recovery device according to claim 1, wherein at least those portions of the inner, intermediate and outer shells defining said gas flow passages are generally cylindrical about said gas flow axis, such that the inner gas flow passage is generally cylindrical and the intermediate and outer gas flow passages are generally annular and concentric with the inner gas flow passage.

7. The integrated heat recovery device according to claim 1, wherein the manifolds of the cooling jacket are arranged side-by-side, and wherein the manifolds are separated by an axial rib provided which extends radially inwardly from the cooling jacket to an outer surface of the outer shell and physically separates the manifolds from each other.

8. The integrated heat recovery device according to claim 1, wherein the manifolds of the cooling jacket are spaced apart from one another by an angle of up to about 180 degrees.

9. The integrated heat recovery device according to claim 1, wherein cooling jacket is provided with a pair of circumferential ribs which extend radially inwardly to an outer surface of the outer shell.

10. The integrated heat recovery device according to claim 1, wherein the coolant inlet and outlet openings are formed proximate to a downstream end of the outer shell.

11. The integrated heat recovery device according to claim 1, wherein the fitting block has an arcuate outer surface which is sealingly connected to an inner surface of the outer shell.

12. The integrated heat recovery device according to claim 1, wherein the arcuate outer surface of the fitting block is provided with apertures which align with the coolant inlet and outlet openings of the outer shell.

13. The integrated heat recovery device according to claim 1, wherein the fitting block is accommodated within a rectangular cutout in a downstream end of the intermediate shell.

14. The integrated heat recovery device according to claim 2, wherein said gas is a motor vehicle exhaust gas, and wherein the integrated heat recovery device further comprises:

(c) a catalyst provided in the inner gas flow passage for treating said motor vehicle exhaust gas;

wherein a direction of gas flow through the integrated heat recovery device is such that the exhaust gas flows through the catalyst prior to being cooled by heat exchange with the liquid coolant.

15. The integrated heat recovery device according to claim 3, wherein said gas is a motor vehicle exhaust gas, and wherein the integrated heat recovery device further comprises:
   (c) a catalyst provided in the inner gas flow passage for treating said motor vehicle exhaust gas;
   wherein a direction of gas flow through the integrated heat recovery device is such that the exhaust gas is pre-cooled by heat exchange with the liquid coolant before it flows through the catalyst.

* * * * *